United States Patent [19]

Hurko et al.

[11] 4,286,377
[45] Sep. 1, 1981

[54] METHOD OF MANUFACTURE FOR A RESISTANCE HEATER AND TEMPERATURE SENSOR

[75] Inventors: Bohdan Hurko; Raymond L. Dills, both of Louisville, Ky.

[73] Assignee: General Electric Company, Louisville, Ky.

[21] Appl. No.: 45,358

[22] Filed: Jun. 4, 1979

Related U.S. Application Data

[62] Division of Ser. No. 921,418, Jul. 3, 1978, abandoned.

[51] Int. Cl.³ .............................................. H01C 7/02
[52] U.S. Cl. ........................................ 29/612; 29/611; 338/25
[58] Field of Search ................... 29/611, 612; 219/449, 219/450, 459, 461, 464, 465, 466; 338/22 R, 22 SD, 25

[56] References Cited

U.S. PATENT DOCUMENTS

| | | |
|---|---|---|
| 2,784,287 | 3/1957 | Glynn .................................... 219/464 |
| 2,916,597 | 12/1959 | Onofri .................................... 219/464 |
| 3,067,315 | 12/1962 | Hurko . |
| 3,191,003 | 6/1965 | Yohe . |
| 3,201,736 | 8/1965 | Ovshinsky ............................. 338/22 |
| 3,417,229 | 12/1968 | Shomphe et al. . |
| 3,423,574 | 1/1969 | Shomphe et al. . |
| 3,496,336 | 2/1970 | Hingorany et al. . |
| 3,553,432 | 1/1971 | Livingston . |
| 3,710,076 | 1/1973 | Frazier . |
| 3,733,462 | 5/1973 | Bouchard ............................. 219/464 |
| 3,748,174 | 7/1973 | Chen et al. ............................ 338/22 |
| 3,789,192 | 1/1974 | Spindler . |
| 3,848,111 | 11/1934 | Brouneus . |
| 3,869,596 | 3/1975 | Howie .................................. 219/464 |
| 3,883,719 | 5/1975 | Hurko . |
| 3,887,785 | 7/1975 | Ahlport ................................ 338/25 |
| 3,895,216 | 7/1975 | Hurko . |
| 4,032,750 | 6/1977 | Hurko ................................. 219/461 |
| 4,045,654 | 8/1977 | Eide .................................... 219/449 |
| 4,103,275 | 7/1978 | Diehl .................................... 338/25 |
| 4,129,848 | 12/1978 | Frank et al. .......................... 219/464 |
| 4,139,833 | 2/1979 | Kirsch ................................. 338/25 |
| 4,146,957 | 4/1979 | Toenshoff ............................ 338/25 |

OTHER PUBLICATIONS

One-Sheet of Minco Thermal Devices, Minco Products, Inc., (Information Bulletin TR).

Primary Examiner—Leon Gilden
Attorney, Agent, or Firm—Bernard J. Lacomis; Radford M. Reams

[57] ABSTRACT

A method for making a combination heater and temperature sensor comprising the steps of forming a heater element pattern in a thin sheet of resistive material and concurrently forming a temperature sensor in a noninterfering portion of the same sheet of resistive material, the forming of the heater and sensor element patterns being carried out by a photoetching process.

3 Claims, 7 Drawing Figures

METHOD OF MANUFACTURE FOR A RESISTANCE HEATER AND TEMPERATURE SENSOR

This is a division of application Ser. No. 921,418 filed Jul. 3, 1978 now abandoned.

BACKGROUND DISCUSSION

This invention concerns thin layer resistive heaters of the type often used in conjunction with solid plate surface heaters in which a thin resistive metal layer is mounted on the underside of a nonconductive glass ceramic plate, such as currently incorporated in some designs of cooking ranges. Such thin layer heaters have in the past taken two basically differing forms, i.e., film heaters in which the resistive layer is bonded to the underside of the glass ceramic plate, or etched foil heaters in which a thin layer of a suitable resistive metal is formed into a pattern by an etching process and is mounted or secured beneath the glass ceramic plate.

An example of a film-type heater is disclosed in U.S. Pat. No. 3,883,719, while an etched foil-type heater is disclosed in U.S. Pat. No. 4,032,750, both of which are assigned to the assignee of the present application.

Commonly associated with such heaters is a temperature sensor which is positioned adjacent the heating element such as to sense when the element temperature reaches an unsafe level. The sensor is associated with a safety circuit to discontinue or interrupt the power to the heater in the event the heater reaches a temperature which endangers the heater element or which could damage the glass ceramic plate.

Such sensors are generally discrete components such as a length of insulated Nichrome wire, mounted directly beneath the heating element. This approach adds significantly to the cost of the assembly since the element must be separately assembled into the heater. In addition, the cost of the material for the temperature sensor itself is added to the cost of manufacture of the unit. Such temperature sensors generally must be insulated electrically from the heating layers in the case of the film heaters such as to not produce a short circuiting between turns in the pattern.

Typically, such thin layer heaters comprise a pattern in which a central opening is formed in order to produce a proper temperature distribution across the area of the heating layer. This temperature sensor has sometimes been located in the region of this central opening.

It is the object of the present invention to provide a temperature sensor for such thin layer heaters which does not require a separate discrete temperature sensor and which does not involve additional assembly labor in installing such temperature sensors and which is compatible with either film or etched foil-type heaters.

SUMMARY OF THE INVENTION

This and other objects of the present invention, which will become apparent upon a reading of the following specification and claims, are accomplished by the use of a thin layer resistive temperature sensor which is comprised of a separate sensor pattern located intermediate the turns in the heating element pattern and which is preferably formed at the same time the heating element layer is formed to preclude the need for a separate assembly step. For etched foil elements, the material which may be etched away in the formation of the heating layer pattern may be utilized instead for a temperature sensor.

The temperature sensor comprises a pattern of a thin layer of sufficiently small cross section area to provide a practical resistive temperature sensor. This pattern may be located within a central opening formed in the heating layer pattern, or alternatively, includes portions thereof extending out of said central regions so as to more nearly respond to the average temperature over the entire area of the thin layer heater element pattern.

The temperature sensor may be formed of the same material as the heater layer, or alternatively a differing material may be utilized for the temperature sensor in order to allow an increased coefficient of resistivity over the heater element material and enable the use of the temperature sensor with simple bridge-type temperature sensor circuits. A relatively slight quantity of material is required to produce a thin layer temperature sensor, and in those cases where manufacturing is carried out by foil etching, the temperature sensor material may be comprised of material normally etched out of the pattern to form the heater element pattern.

In either event, a separate installation of temperature sensor into the heater is not required and the additional costs for material are either nill or very slight.

DETAILED DESCRIPTION

In the following detailed description, certain specific terminology will be utilized for the sake of clarity and a particular embodiment described in accordance with the requirement of 35 USC 112, but it is to be understood that the same is not intended to be limiting and should not be so construed inasmuch as the invention is capable of taking many forms and variations within the scope of the appended claims.

Figure 1:
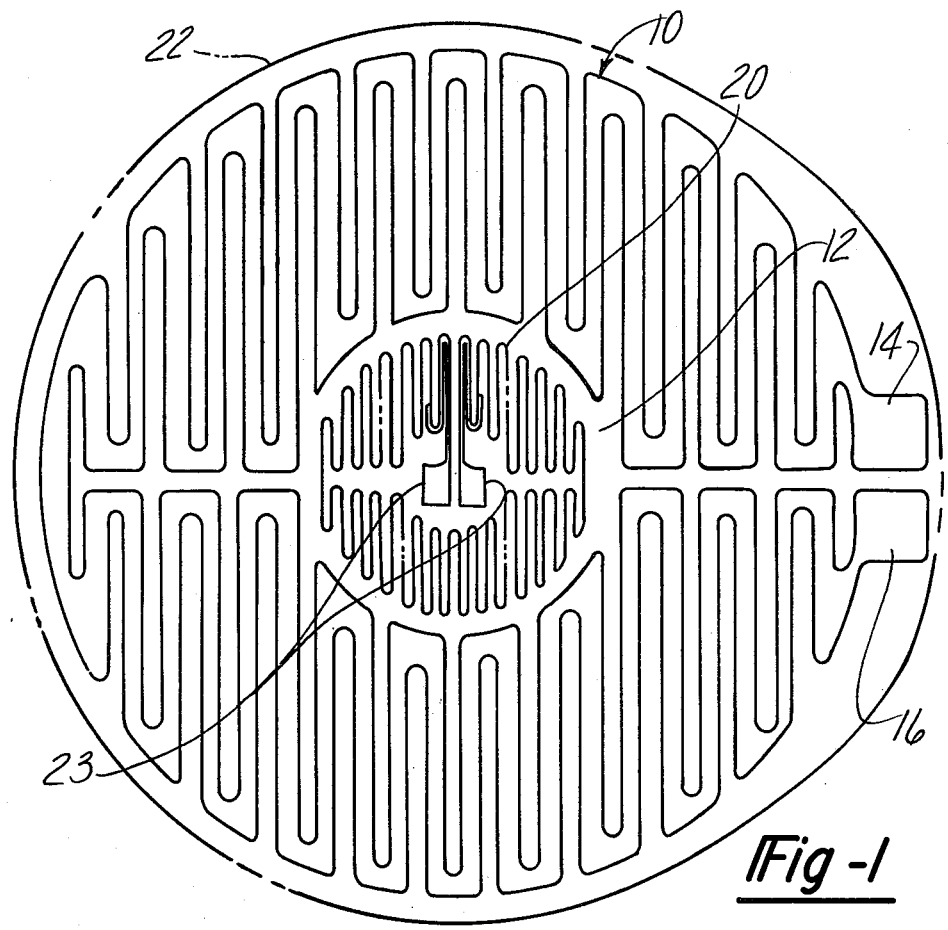
FIG. 1 is a plan view of a foil element heater pattern incorporating a temperature sensor according to the present invention.

Referring to the drawings and particularly to FIG. 1, an etched foil heater element 10 is depicted and comprises a thin layer of a suitable resistive foil material such as stainless steel or Nichrome, which is formed into a serpentine pattern extending about the area to be heated. This pattern forms a path or circuit for electrical current passed therethrough which is the manner well known in the art. The pattern is formed with a central opening 12 in the heater element 10 and within this central opening 12 is disposed a temperature sensor pattern. This similarly can be comprised of a serpentine pattern of the same material as formed the heater element 10, but in which the turns are formed of a much thinner cross sectional area so as to provide sufficiently great electrical resistance. A particular resistance level would be selected to be compatible with the system particulars of the temperature sensing safety circuitry (not shown). By this technique, a resistive of 450 ohms can easily be produced.

The heater element 10 is formed with terminals 14 and 16 in the pattern, with power supply leads supplying the electrical power to the heater element 10, as will be described hereinafter. The heater element 10 and temperature sensor 20, as noted, may both be formed of the same material depending on the requirements of the safety control circuitry of the particular application.

That is, if solid state electronic control circuitry is utilized with a relatively low coefficient of resistance, materials can be employed for the temperature sensor 20 such as Kanthal (an iron-aluminum cobalt chrome alloy), Nichrome or Inconel 600 and 601.

If a simple bridge-type circuit is employed, a higher coefficient of resistivity is necessary and in such cases either a heater element material can be employed which has characteristics satisfactory for the heater element and which also exhibits a sufficiently high coefficient of resistivity may be employed, or alternatively, a foil preform may be employed in which there is an insert in the region whereat the sensor is to be formed of a material of a high coefficient of resistance.

In the former case, the pre-form 22 is formed of a TD Nickel alloy sold by the Wilbur Driver Company, and which is a nickel-thorium alloy (1% thorium) to meet the coefficient of resistivity requirements of safety circuits, as noted.

An appropriate pattern for both the heater element 10 and the temperature sensor 20 is photoetched into the pre-form 22 such that the sensor material is provided substantially at no cost and simultaneously with the production of the heater element 10, as depicted in FIG. 1. Alternate forming processes are of course possible.

Figure 3:
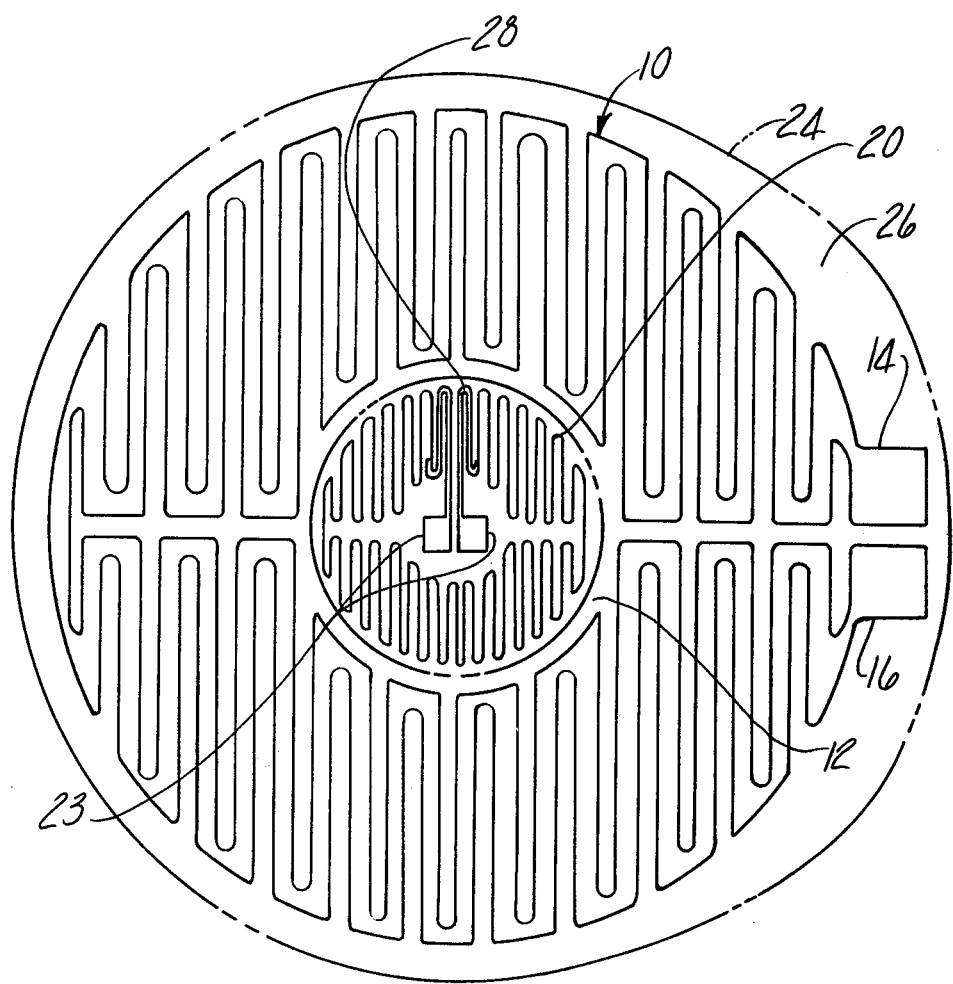
FIG. 3 depicts an alternate version of the foil preform having an inset section from which is formed the temperature sensor pattern.

In the alternate embodiment mentioned above, a pre-form 24 (FIG. 3) is provided consisting of an outer annular foil layer 26 formed of the aforementioned heating material with an insert 28 of a high coefficient of resistivity material, such as a pure nickel layer formed therein. In this event, the temperature sensor 20 and the heater element 10 can be formed simultaneously and preferably will be formed simultaneously to simplify manufacture.

The sensor also has end terminals 23 for connection to the basic control circuit (not shown).

Figure 2:
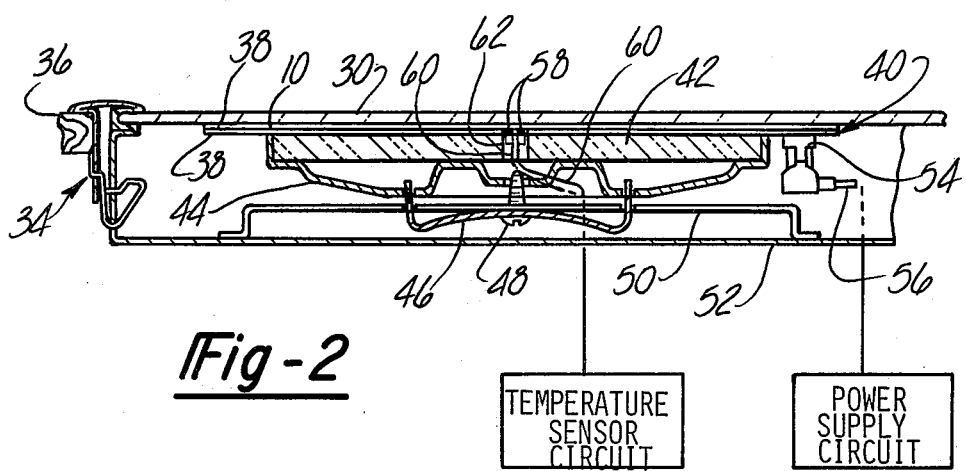
FIG. 2 is a side elevational sectional view of a heater assembly incorporating an electrical heater element with a temperature sensor arrangement according to the present invention.

FIG. 2 depicts a typical installation of the heater element 10 and the temperature sensor 22 into a heater assembly. The heater element 10 forms the middle of a sandwich. A glass ceramic plate 30 is mounted by means of a suitable mounting arrangement to a kitchen countertop 36.

The heater element 10 and the temperature sensor 20 are sandwiched between layers of a dielectric sheet 38 which may be bonded or cemented together as disclosed in U.S. Pat. No. 4,032,750 and copending Ser. No. 784,604, filed Apr. 4, 1977, or any other suitable arrangements. The sandwich assembly, generally as 40, is mounted to the under surface of the glass ceramic plate 30 by an arrangement including an insulating pad 42 and a pan 44 which houses the insulating pad 42 and serves to exert an upward pressure on the heating element sandwich assembly 40 by means of a spring 46 and a fastener 48 located in the bracket section 50. The entire assembly is supported within a box 52. All of these components are described in the aforementioned U.S. Pat. No. 4,032,750, and further details of the same will not be herein included, reference being had to such patent for these details.

The terminals 14 and 16 are secured to terminal 54 projecting downwardly to which is secured the lead 56 to the power supply circuit (not shown). Similarly, the end terminals 23 of the temperature sensor 20 are mounted to downwardly projecting tabs 58, to which is secured the lead 60 of the safety control circuit (not shown). The lead 60 passes through an opening 62 formed in the insulating pad 42.

Figure 4:
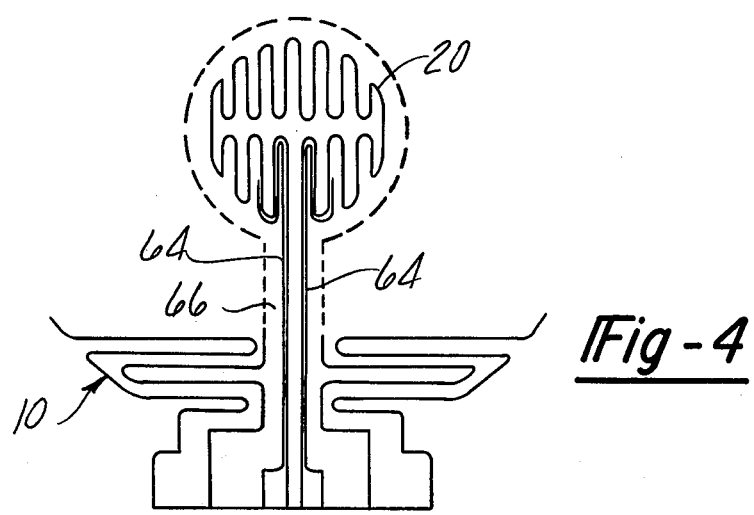
FIGS. 4 and 5 are plan views of foil heater elements with alternate versions of the temperature sensor according to the present invention.

It may be desirable to sense a temperature of the heater which is more nearly an average of the temperature existing through the area of the heater element 10 pattern. In such case, portions of the lead sections 64 (FIG. 4) of the end terminals 23 can extend through a radially extending opening 66 in the heater element 10 pattern, such that the lead section 64 is subjected and contributes to the change in resistance of the temperature sensor 20. This influences the change in resistance of the temperature sensor 20 by the temperature changes at radially outward sections from the central opening formed in the heater element 10 pattern.

Figure 5:
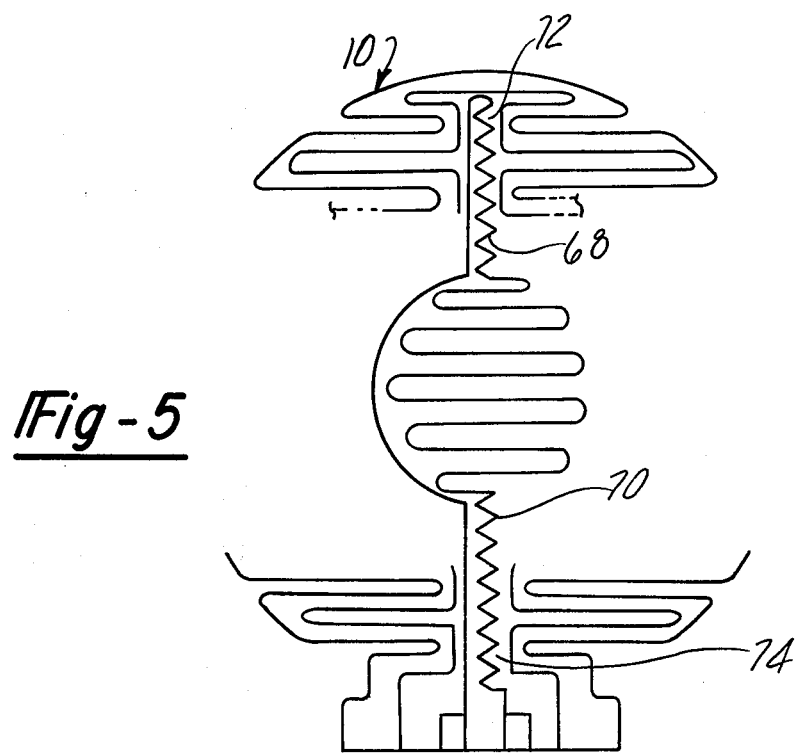

This may be further accentuated by having the central section sinuously configured at sections 68 and 70 (FIG. 5) which extend into a pair of radial openings 72 and 74 formed in the heater pattern to further affect the overall resistance change by temperature changes at radially outboard portions of the heater element 10 pattern.

Figure 6:
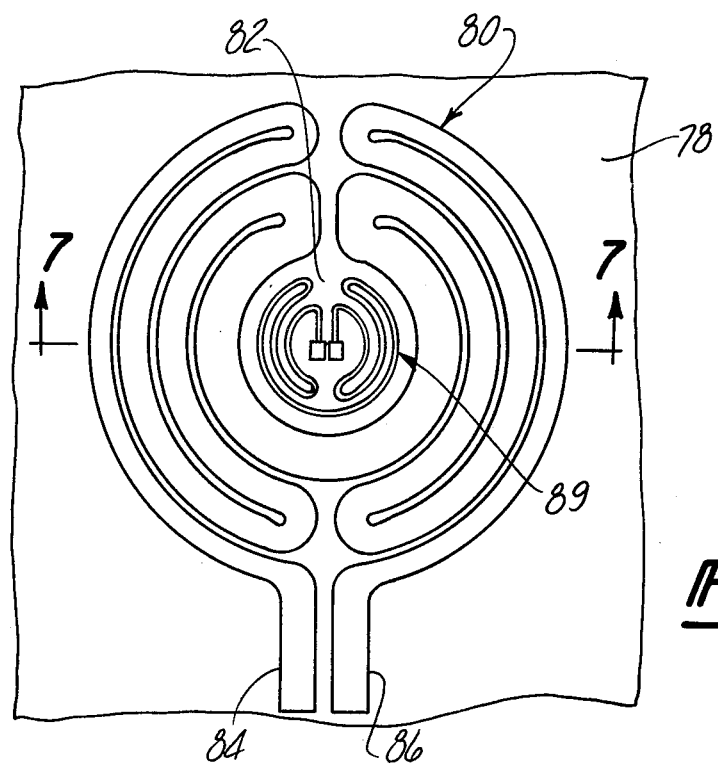
FIG. 6 is a plan view of the heater assembly of a film layer heater element incorporating a film layer temperature sensor according to the present invention.
Figure 7:
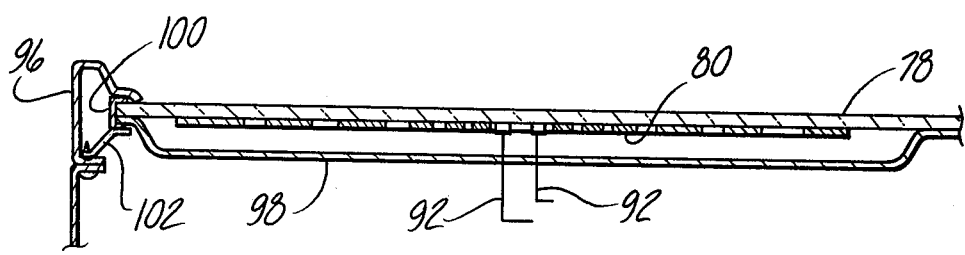
FIG. 7 is a sectional view of a portion of a heater assembly incorporating the film temperature heater element with the temperature sensor depicted in FIG. 6 taken through the lines 7—7 of FIG. 6.

As noted above and depicted in FIGS. 6 and 7, the same concept is applicable to film heaters in which a plate 78 has bonded on the under surface thereof a film pattern 80 such as to comprise a layer of gold or platinum as taught in U.S. Pat. Nos. 3,883,719 and 3,067,315.

The film pattern 80 includes a sinuous convolution pattern extending about the area of the heater element 10 with a central opening 82 within which a temperature sensor film pattern is located. The film pattern 80 is formed with power terminals 84 and 86, while the temperature sensor 88 is formed with terminals 90 for connection to the safety control circuit. The physical arrangement would be similar to the arrangement described in U.S. Pat. No. 3,883,719 with the terminals 84 and 86 joined to leads 92. The entire assembly would be located on an appliance metal frame 96 with an underpan 98 secured by means of a gasket 100 and mounting lip 102.

Accordingly, it can be appreciated that the temperature sensor has been provided at a much reduced cost from the installation of a separate discrete temperature sensing component with a substantial savings in both labor and material and which has exhibited reliability due to the nature of the manufacturing process. It is relatively simple to implement and the object of the present invention has been achieved.

The embodiments of the invention in which an exclusive property or privilege is claimed are defined as follows:

1. A method of manufacturing a heater including a temperature sensor means, comprising the steps of:
   forming a serpentine shaped heater element pattern in a first thin sheet of resistive material, said pattern defining a first electrical current flow path;

forming a serpentine shaped temperature sensor pattern in a second thin sheet of a material different from said first sheet and having a relatively high coefficient of resistivity, said second sheet substantially circumscribed by said first sheet and said sensor pattern being electrically insulated from said heater element pattern and having portions of a much thinner width than said heater element pattern portions, said temperature sensor pattern defining a second electrical current flow path independent of said first path, said steps being performed simultaneously by photoetching said patterns out of said sheets.

2. The method according to claim 1 wherein said method further includes the step of assembling said formed sheet into a sandwich having electrically insulative layers disposed on either side of said formed sheet.

3. The method according to claim 2 wherein said method further includes the step of mounting said sandwiched formed sheet against a glass ceramic plate, whereby said plate may be heated by passing electrical current through said heater element pattern, said glass ceramic plate comprising a support surface for said heater element.

* * * * *